US007856487B2

(12) United States Patent
Kalis

(10) Patent No.: US 7,856,487 B2
(45) Date of Patent: Dec. 21, 2010

(54) SYSTEM AND METHODS FOR UPDATING REGISTRATION INFORMATION FOR A COMPUTER JUKEBOX

(75) Inventor: Jeffrey J. Kalis, Rockford, MI (US)

(73) Assignee: AMI Entertainment Network, Inc., Bristol, PA (US)

( * ) Notice: Subject to any disclaimer, the term of this patent is extended or adjusted under 35 U.S.C. 154(b) by 1000 days.

(21) Appl. No.: 11/411,843

(22) Filed: Apr. 27, 2006

(65) Prior Publication Data

US 2007/0255808 A1 Nov. 1, 2007

(51) Int. Cl.
*G06F 15/16* (2006.01)

(52) U.S. Cl. ....................................... 709/220; 709/200

(58) Field of Classification Search ......... 709/201–203, 709/217–219, 200

See application file for complete search history.

(56) References Cited

U.S. PATENT DOCUMENTS

| | | | | |
|---|---|---|---|---|
| 5,046,004 | A | 9/1991 | Tsumura et al. | |
| 5,191,573 | A | 3/1993 | Hair | |
| 5,341,350 | A | 8/1994 | Frank et al. | |
| 5,355,302 | A | 10/1994 | Martin et al. | |
| 5,388,181 | A | 2/1995 | Anderson et al. | |
| 5,734,961 | A | 3/1998 | Castille | |
| 5,781,889 | A | 7/1998 | Martin et al. | |
| 5,915,238 | A | 6/1999 | Tjaden | |
| 5,966,495 | A | 10/1999 | Takahashi et al. | |
| 6,240,550 | B1 | 5/2001 | Nathan et al. | |
| 6,308,204 | B1 | 10/2001 | Nathan et al. | |
| 6,336,219 | B1 | 1/2002 | Nathan | |
| 6,346,951 | B1 | 2/2002 | Mastronardi | |
| 6,381,575 | B1 | 4/2002 | Martin et al. | |
| 6,397,189 | B1 | 5/2002 | Martin et al. | |
| 6,578,051 | B1 | 6/2003 | Mastronardi et al. | |
| 7,085,292 | B1 * | 8/2006 | Grayson | 370/475 |
| 2001/0039611 | A1 * | 11/2001 | Lin et al. | 713/1 |
| 2002/0126141 | A1 | 9/2002 | Mastronardi | |
| 2003/0135424 | A1 * | 7/2003 | Davis et al. | 705/26 |
| 2004/0025185 | A1 * | 2/2004 | Goci et al. | 725/92 |
| 2005/0060405 | A1 * | 3/2005 | Nathan et al. | 709/225 |
| 2005/0216348 | A1 | 9/2005 | Martin et al. | |
| 2006/0018209 | A1 * | 1/2006 | Drakoulis et al. | 369/30.28 |
| 2006/0041581 | A1 * | 2/2006 | Aghvami et al. | 707/102 |
| 2007/0055390 | A1 * | 3/2007 | Simon et al. | 700/19 |
| 2007/0086280 | A1 * | 4/2007 | Cappello et al. | 369/30.06 |
| 2008/0195443 | A1 * | 8/2008 | Nathan et al. | 705/7 |
| 2009/0019141 | A1 * | 1/2009 | Bush et al. | 709/223 |

FOREIGN PATENT DOCUMENTS

| | | | | |
|---|---|---|---|---|
| EP | 1345440 | A2 | * | 9/2003 |
| EP | 1746548 | A2 | * | 1/2007 |

* cited by examiner

*Primary Examiner*—Moustafa M Meky
(74) *Attorney, Agent, or Firm*—Dickstein Shapiro LLP

(57) ABSTRACT

Systems and methods for updating registration information for a computer jukebox are provided. The registration system and methods provide updated information for registration or authorization of a jukebox to a central computer after the occurrence of a pre-selected event (e.g., changing MAC address, changing the hard drive, memory, or Central Processing Unit (CPU)). The invention reduces or eliminates the need for the owner or operator of a jukebox to contact the owner or operator of the network in order to provide updated registration information following the occurrence of a pre-selected event.

22 Claims, 3 Drawing Sheets

SYSTEM AND METHODS FOR UPDATING REGISTRATION INFORMATION FOR A COMPUTER JUKEBOX

BACKGROUND OF THE INVENTION

For decades, the term jukebox was synonymous with a housing for a phonograph player and a collection of musical recordings stored in the housing as a plurality of records. These jukeboxes were usually large and were mainly located in establishments like bars and restaurants. Eventually, the records in jukeboxes were replaced with compact discs (CDs). Although compact discs increased the sound quality of conventional jukeboxes, routinely updating conventional jukeboxes was a lengthy and cumbersome task.

Updating conventional jukeboxes required a significant investment of time and money. Routemen were required to travel to each jukebox location to replace outdated recordings with up-to-date CDs or records. A new physical copy of each disc was needed for every location and many unneeded copies of the outdated recordings remained after removal from the jukebox. New ways to store and update musical recordings on jukeboxes were needed to eliminate or reduce this laborious and expensive update procedure.

The influx of digital music provided an opportunity to change the design and operation of conventional jukeboxes. As suggested in U.S. Pat. No. 5,355,302, conventional jukeboxes could be replaced with a network of computer jukeboxes capable of storing digital music in memory and updating the music contained on the jukebox over a network connection. Computer jukeboxes reduced the necessity of routemen to update jukeboxes manually. The computer jukeboxes provided many advantages beyond the saved expense in updating. A plurality of jukeboxes could now be controlled via a central management center, allowing tasks such as royalty accounting to be performed centrally. Digital music has become increasingly popular, and compression technologies decreased the necessary file size, allowing any computer system with speakers to become a jukebox. A large market was created for digital jukeboxes, including personal jukeboxes in homes (e.g., home computers using a variety of online music delivery services).

With most digital jukebox systems, a security system is needed to ensure that the user and/or owner of the jukebox is authorized to use the jukebox system. Security systems may require the owner, operator, or user of a digital or personal jukebox to register a "user name" and a "password" with a central computer within the central jukebox system. In the event a user/owner wishes to access his account to, for example, download content or make changes to the user/owner account, the central computer can require the user to provide the previously registered user name and associated password indicating that the user/owner is authorized to access the account.

However, in certain jukebox systems, various components of the system may be removed or replaced in order to maintain the system. For example, a local hard drive might be exchanged or replaced to provide additional local music content and/or updated software. The identification numbers associated with components can be used as unique identifiers to register the jukebox with the central computer. In such systems a user name and password may not be sufficient to authenticate the jukebox. Software or music files requiring appropriate licenses prior to use may be loaded into the memory of a computer jukebox and require authentication. Therefore, the user is required to call a service technician to manually update the registration information for the jukebox before the component parts or software can be used as desired. Manually updating the registration for a jukebox on a jukebox network can be inconvenient. For example, a large number of staff may be required to respond to changes in registration for jukeboxes on the network. Furthermore, manually changing the registration by calling a service technician may be time consuming—especially if a user/owner is responsible for a large number of jukeboxes on a network.

Accordingly, there is a desire for an efficient system and method for auto registration of a networked jukebox.

SUMMARY

In various exemplary embodiments, the invention relates to a system and method for updating the registration of a jukebox connected to a central computer controlling a plurality of networked, digital jukeboxes. Each of the networked, digital jukeboxes can store and play digital music files that may be downloaded from a central music repository. A central data center can be provided for managing the jukeboxes. The registration methods and systems provide information for registration or authorization of a jukebox to a central computer after the occurrence of a pre-selected event (e.g., changing a MAC address, changing the hard drive, memory, or Central Processing Unit (CPU)). The functionality, when activated, reduces or eliminates the need for the owner or operator of a jukebox to contact the owner or operator of the network in order to provide the appropriate authorization or updated information for continued use of the computer jukebox following the occurrence of a pre-selected event.

A preferred embodiment of the invention provides methods for updating registration information for a computer jukebox after the occurrence of a pre-selected event, comprising determining whether the pre-selected event has occurred; updating information at the jukebox based on the occurrence of the pre-selected event; sending the updated information from the computer jukebox to the central server; and updating the registration information for the computer jukebox, wherein the registration information comprises the updated information.

Preferred embodiments of the invention also provide systems for updating registration information for a computer jukebox after the occurrence of a pre-selected event, comprising at least one computer jukebox; and a central server coupled to the computer jukebox operative to control the at least one computer jukebox, wherein the central server receives identification information and updated registration information after the occurrence of a pre-selected event, the central server being operative to validate the identity of the computer jukebox and to update the registration information for the at least one jukebox.

BRIEF DESCRIPTION OF THE DRAWINGS

The foregoing and other aspects of the invention can be further understood from the following detailed description of the invention, which is provided in connection with the accompanying drawings, in which.

DETAILED DESCRIPTION OF PREFERRED EMBODIMENTS

Figure 1:
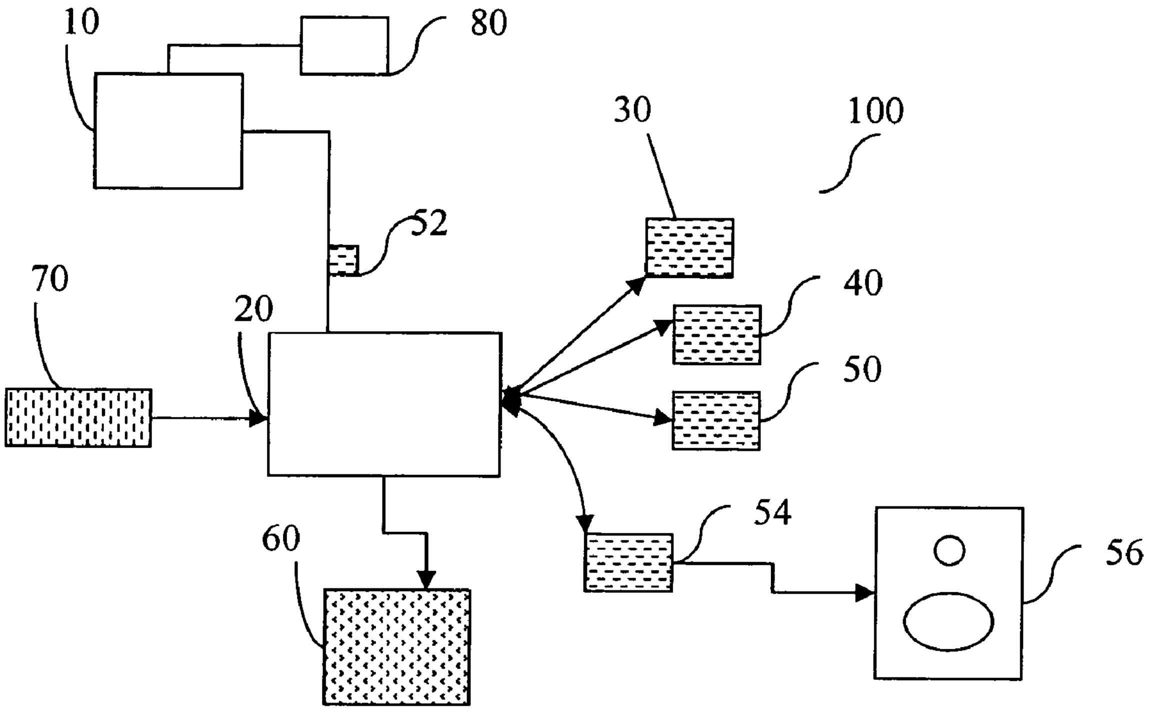
FIG. 1 is a block diagram of a part of a jukebox system that can be used in accordance with preferred embodiments of the invention.

In the following detailed description, reference is made to the accompanying drawings, which form a part hereof and show by way of illustration specific embodiments in which the invention may be practiced. The embodiments are described in sufficient detail to enable those skilled in the art to practice the invention, and it is to be understood that other embodiments may be utilized, and that changes to the described embodiments may be made without departing from the spirit and scope of the present invention.

The term "jukebox" or "digital jukebox" or "computer jukebox" includes not only conventional jukeboxes that are found in bars and restaurants, but more broadly includes any computer with sophisticated audio play capabilities. Thus, any processing system that can play a song in response to a user's input is included within these terms as used herein. For example, a "jukebox" includes, but is not limited to, a desktop computer, a laptop computer, a personal digital assistant ("PDA") or any related handheld device, a cellular telephone, or a Bluetooth device. The term "registration" as used herein refers to associating a product or item with a person, company or other entity. For example, registration of a computer jukebox can comprise associating unique information regarding the computer jukebox or components of the computer jukebox with a jukebox owner or a user. The term "updated information" refers to information regarding the computer jukebox that has been changed or altered. For example, a new MAC address or a new hard drive identification number can be considered updated information. New authentication or license codes for software and/or licensed content (e.g., music files) can also be considered updated information.

In accordance with preferred embodiments of the invention, a plurality of computer jukeboxes are networked to a central server which controls various functions of the computer jukebox. In one embodiment, the MAC address of the Network Interface Card of the core computer mother board is used to uniquely identify a specific computer jukebox on the network. In another embodiment, a hard drive identification number is used to specifically identify a hard drive and, optionally, an inventory of music authorized to be resident on the hard drive. The MAC address and hard drive identification number can be used by the system to uniquely correspond to a specific model and serial number for a computer jukebox.

It is likely that over time, the core computer and/or hard drive will be changed or replaced. For example, the core computer could be replaced to repair a damaged computer jukebox or provide the computer jukebox with additional power and/or functionality. Likewise, a hard drive can be replaced to correct a defect, provide increased storage capacity, or offer a different selection of music. The identification numbers associated with the core computer, hard drive, or another hardware or software component of the computer jukebox can be associated with the owner, operator, or user of a computer jukebox. The identification of an owner, operator, user and the associated identification information for hardware and/or software components of the computer jukebox collectively can be registration information. Such registration information can be used to determine if the owner, operator, or user is authorized to administer, use, or otherwise operate the computer jukebox. When a hardware or software change is made to the computer jukebox, the previous registration information associating an owner, operator, or user with, for example, a MAC address or a hard drive identification number may no longer be correct. Thus, the registration information may need to be updated in order for the owner, operator, or user to continue to operate the computer jukebox on the network.

Previously, when a hardware or software change requiring updated registration was made to a computer jukebox, the owner, operator, or user would be required to contact the network operator by phone to provide the updated information. The present invention provides simplified and more convenient methods and systems for updating the registration information for a computer jukebox.

With reference to FIG. 1, a portion of a jukebox system 100 according to a preferred embodiment of the invention is shown. The jukebox system 100 includes an exemplary computer jukebox 20 coupled to a central server 10. It should be understood that any number of computer jukeboxes can be coupled to central server 10. Computer jukebox 20 can comprise a plurality of hardware components including, for example, hard drive 30, memory 40, and central processing unit ("CPU") 50. Hard drive 30 can include an internal hard drive of any suitable size (e.g., 10 GB to 300 GB or larger) or an external hard drive coupled to the computer jukebox 20 through an interface (e.g., USB, firewire, wireless, and serial connection). Hard drive 30 can also include portable hard drives or RAM devices (e.g., iPOD, iRiver, Creative Zen) having smaller capacities (e.g., 128 mb through 20 GB or larger) and which are capable of being coupled to the computer jukebox 20 through an interface (e.g., USB, firewire, wireless, and serial connection). Memory 40 can include any suitable memory of any type (RAM, ROM, hard drive, and flash drive). CPU 50 can include any suitable central processing unit which, for example, is compatible with a computer and/or a computer jukebox (e.g., Intel Pentium 4, Intel Celeron, AMD Athalon etc.).

The central server or data center 10 can be a plurality of computer servers, each of which, it should be understood, may include all necessary computer hardware and software for receiving, sending, and processing information. When central server 10 comprises a plurality of servers, each may function to communicate with a respective set of computer jukeboxes (e.g., computer jukebox 20), or each server may provide particularized functions for the central server 20. For example, one of the servers may be primarily for communicating with the computer jukeboxes. An additional server may be used for storing digital music files that can be downloaded by the individual jukeboxes. Another server may be used as a database 80 containing information necessary for managing each of the individual jukeboxes (e.g., computer jukebox 20). Such information can include registration and identification information for each jukebox. This database 80 may also contain information for calculating billing and/or royalty payments.

Each computer jukebox 20 can include at least one memory 40 for storing a plurality of digital music files and information relating to the stored musical files. Other media for storing music, such as CDs or vinyl albums, may be played by the jukeboxes. The memory may be a hard drive, a collection of hard drives, or any other type of memory capable of storing large quantities of digital music files (compact flash, secure digital, memory stick, flash RAM). Each jukebox 20 also has a display 60, which may display graphics, such as album covers, but also displays text such as selection instructions and song titles. The display 60 is preferably in the form of a touch-screen, such that a user can make his selections by pressing points on the display 60. The display 60 may be a CRT, LCD, plasma, DLP or any other form of a monitor or screen. Computer jukeboxes 20 also have a processor 50, a communication interface 52, and an audio reproduction circuit 54 coupled to at least one speaker 56 for replaying the songs. The audio reproduction circuit 54 may include a sound card, a digital-to-analog converter, and means for decompressing compressed, digital files. Other optional parts of the jukeboxes include a money detector, such as a coin, bill, and/or credit card acceptor, and a user input device 70, (e.g., a keypad, manual keyboard, mouse, trackball, pen and other types of selection devices). Computer jukebox 20 can include other peripheral devices including, but not limited to, a plurality of CD-ROM players, DVD ROM, and printers.

In another embodiment, an operator computer is provided to manage at least one computer jukebox on the network. The term "operator computer" refers to a computer that is not the central server, or part of the central server, and is not the computer jukebox but rather is a computer utilized by the owner, operator, or operating company for the computer jukebox. The operator computer can be used, for example, to initiate a request to update registration information for one or more computer jukeboxes on the network. In another embodiment, the operator computer can receive a request to update the registration information for a computer jukebox from the central server. Preferably, the operator computer can connect to a computer jukebox and/or the central server over the internet.

Figure 2:
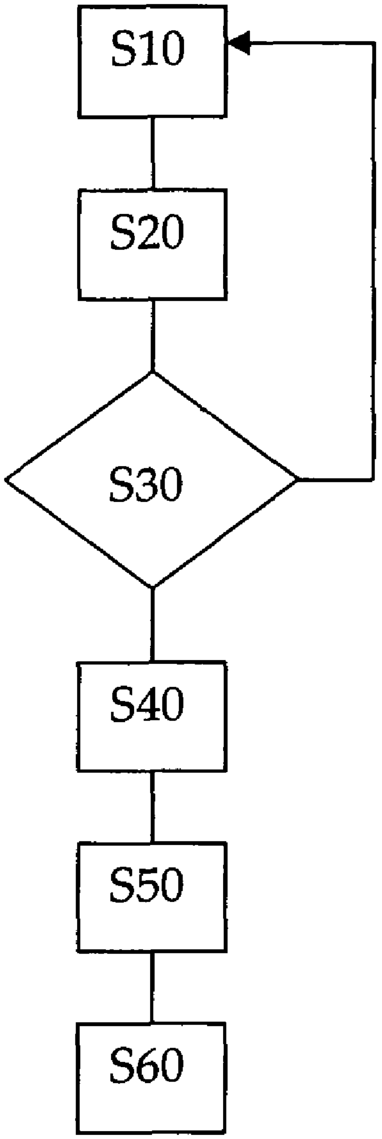
FIG. 2 shows an exemplary flow chart depicting a preferred process for carrying out embodiments of the invention.

FIG. 2 is a flowchart depicting an exemplary method for updating the registration information for a computer jukebox after the occurrence of a pre-selected event. In one embodiment of the invention, central server 10 sends a request for identification information to the computer jukebox 20 (S10). Identification information can include, for example, the MAC address of the Network Interface Card on the core computer mother board. The MAC address can uniquely identify the computer jukebox. Other unique identifiers can include, but are not limited to, the hard drive identification number and the jukebox serial number which can be stored, for example, in memory 40. Next, the identity of the computer jukebox 20 can be determined by, for example, obtaining the identifying information regarding the computer jukebox (S20). For example, the computer jukebox 20 can send the identifying information to central server 10. Central server 10 can compare the identifying information provided by computer jukebox 20 to the identifying information for computer jukebox 20 stored in database 80 on the central server to identify the jukebox.

In another embodiment, the central server 10 or the computer jukebox 20 can determine if a pre-selected event has occurred. The term "pre-selected event" refers to an event or occurrence which indicates that the registration information for the computer jukebox should be updated. For example, if the mother board in the computer jukebox has been replaced, the MAC address for the computer jukebox would be different than the MAC address for the previous mother board. When the computer jukebox with a new mother board is first powered on and connected to the central server, the central server may not recognize the MAC address in the new mother board. In this example, the presence of a new MAC address at the computer jukebox can be considered a pre-selected event. In one embodiment, a software application running on the computer jukebox 20 recognizes the change in mother board and generates a registration prompt to display on the jukebox as discussed in more detail below.

In another embodiment, replacement of the hard drive can be considered a pre-selected event. In this situation, the hard drive identification number for the new hard drive may not be recognized by the central server. Other pre-selected events include, but are not limited to, changing a hardware component of the jukebox (e.g., RAM, CD Drive, DVD Drive, CPU, monitor, and input device). In another embodiment, a change in the operating system or other software component of the computer jukebox 20 is a pre-selected event.

For each of the potential pre-selected events, a software application on the computer jukebox 20 can recognize that the pre-selected event has occurred, and can generate a prompt for a jukebox operator or user to enter registration information. For example, the computer jukebox can include software which can detect replacement of the hardware component (e.g., mother board, hard drive, CD ROM Drive, DVD drive, etc.). In another embodiment, the central server determines if a pre-selected event has occurred. For example, the central server can compare the identification information received from the computer jukebox 20 with the corresponding identification information stored at the central server (e.g., in database 80). If the identification information received from the computer jukebox is different from the identification information stored at the central server, the central server can determine that a pre-selected event has occurred.

If a pre-selected event has occurred in S30, the central server can request updated registration information from the computer jukebox (S40). For example, if the pre-selected event has occurred, the central server can request identifying information that may have changed following the pre-selected event. If the mother board has been changed, for example, the central server can request the new MAC address. In another example, the central server can request the new hard drive identification number if the hard drive identification number has been changed.

In another embodiment, if the pre-selected even has not occurred in S30, the process can start again with step S10.

In one embodiment of the invention, the computer jukebox can send the identification information requested in S40 to the central server (S50). The computer jukebox 20 can automatically send this information without any interaction, for example, with a user, owner, or operator of the computer jukebox 20. The computer jukebox can also send the identification information requested in S40 to an operator computer.

Figure 3:
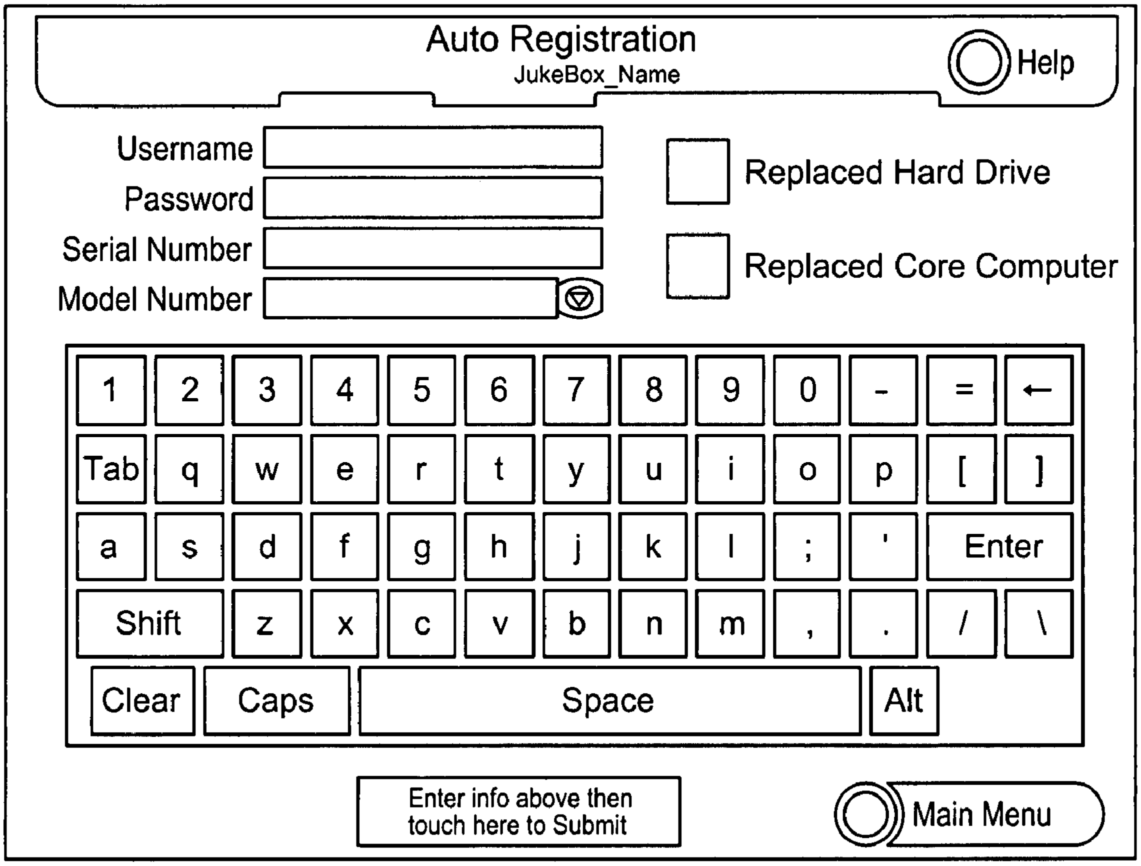
FIG. 3 shows an exemplary user interface that can be presented on a display for a computer jukebox in accordance with preferred embodiment of the invention.

Alternatively, the computer jukebox 20 can "self-detect" the occurrence of a pre-selected event. In this embodiment, the computer jukebox 20 can detect a pre-selected event (e.g., replace hard drive, replace core computer). After detecting a pre-selected event, the computer jukebox 20 can present an Auto Registration page to the user, owner, or operator of the computer jukebox 20 on the display 60 as depicted, for example, in FIG. 3. As shown in FIG. 3, the owner, operator, or user can be prompted to enter a username, password, serial number, and model number. The owner, operator, or user may indicate which pre-selected event (or events) has occurred (e.g., replace hard drive, replace core computer). The presentation of an Auto Registration page can be initiated by a software application upon detection of the pre-selected event. In another embodiment, when a jukebox operator has caused a pre-selected event (such as switching hard drives), the operator can initiate the presentation of the Auto Registration page while the computer jukebox 20 is in a service mode.

In addition to the updated information regarding the pre-selected event, the jukebox owner, operator or user also is asked to enter information that identifies the jukebox. For example, the operator may be asked to enter a username and password. This information is necessary to ensure the validity of the updated information either internally or when it is thereafter transmitted to the central server 10.

After the owner, operator, or user submits the requested information, the computer jukebox 20 can establish communication with the central server 10 and transfer the information to the central server 10. The username and password can be used to authenticate the person entering the information on the Auto Registration page and/or identify the company which owns or operates the computer jukebox 20. The central server 10 can associate the new identification information received from the computer jukebox 20 (e.g., new MAC address and/or new hard drive identification number) with the owner, operator, user, and/or company associated with the particular computer jukebox 20. If any of the information provided by the computer jukebox (e.g., information entered by an operator, owner, or user or information automatically provided by the computer jukebox) is missing or incorrect, the central server can send a message to the computer jukebox indicating that the information was incorrect or incomplete. The message can be logged in a computer jukebox error log. In this example, the Auto Registration page will appear again when the computer jukebox 20 is powered on.

In another embodiment, the Auto Registration page can be presented at a website accessible on an operator's computer. For example, if an operator knows that a pre-selected event has occurred, before rebooting the computer jukebox 20, the operator can update the information regarding the pre-selected event through an Auto Registration page from his operator computer. The entered information, including updated registration information and identifying information, can be sent from the operator computer to the central server 10.

It should be understood that any number of pages can be displayed on the display 80 to prompt the entry of information by an owner, operator, or user. For example, additional pages can be provided prompting an owner, operator, or user to enter additional information about the owner, operator, or user (e.g., new contact name, address, phone number, and email address) or additional information regarding the pre-selected event (e.g., model number for new mother board and/or hard drive).

In any of these embodiments, the central server 10 can update the registration information for the computer jukebox after receiving the updated information from the computer jukebox 20, for example, at step S60 as shown in FIG. 2. The registration information can be stored, for example, in database 80 and/or in memory 40 of the computer jukebox 20.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Additionally, any modifications, though presently unforeseeable, of the present invention that come within the spirit and scope of the following claims should be considered part of the present invention.

What is claimed as new and desired to be protected by Letters Patent of the United States is:

1. A method for updating registration information for a computer jukebox after the occurrence of a pre-selected event, comprising:

determining whether the pre-selected event has occurred;

updating information at the jukebox based on the occurrence of the pre-selected event;

sending the updated information from the computer jukebox to the central server; and updating the registration information for the computer jukebox at the central server, wherein the registration information comprises the updated information, wherein the updated information is selected from a group consisting of a MAC address, a hard drive identification number, a jukebox model number, and a jukebox serial number.

2. The method of claim 1, wherein the step of sending the updated information comprises sending identifying information unique to the operator of the computer jukebox.

3. The method of claim 2, wherein an operator of the computer jukebox provides the identifying information in response to a prompt.

4. The method of claim 3, wherein the operator of the computer jukebox provides a description of the pre-selected event.

5. The method of claim 1, wherein the pre-selected event comprises changing a hardware component of the computer jukebox.

6. The method of claim 5, wherein the registration information comprises information selected from a group consisting of a MAC address, a hard drive identification number, a jukebox model number, and a jukebox serial number.

7. A method for updating registration information for a computer jukebox after the occurrence of a pre-selected event, comprising:

determining whether the pre-selected event has occurred;

updating information at the jukebox based on the occurrence of the pre-selected event;

sending the updated information from the computer jukebox to the central server; and updating the registration information for the computer jukebox at the central server, wherein the registration information comprises the updated information, wherein the pre-selected event comprises changing a hardware component of the computer jukebox.

8. The method of claim 7, wherein the step of determining whether the pre-selected event has occurred is performed by a software application running on the computer jukebox.

9. The method of claim 7, wherein the hardware component is selected from a group consisting of the Network Interface Card, the hard drive, the motherboard, the RAM, a CD drive, a DVD drive, a CPU, and a monitor.

10. The method of claim 7, wherein the step of determining is done by an operator of the computer jukebox, and wherein the operator of the computer jukebox enters the updated information upon said determination while the computer jukebox is operating in a service mode.

11. A method for updating registration information for a computer jukebox after the occurrence of a pre-selected event, comprising:

determining whether the pre-selected event has occurred;

updating information at the jukebox based on the occurrence of the pre-selected event;

sending the updated information from the computer jukebox to the central server; and updating the registration information for the computer jukebox at the central server, wherein the registration information comprises the updated information, wherein the registration information comprises information selected from a group consisting of a MAC address, a hard drive identification number, a jukebox model number, and a jukebox serial number.

12. A system for updating registration information for a computer jukebox after the occurrence of a pre-selected event, comprising:

at least one computer jukebox; and a central server coupled to the computer jukebox operative to control the at least one computer jukebox, wherein the central server receives identification information and updated registration information after the occurrence of a pre-selected event, the central server being operative to validate the identity of the computer jukebox and to update the registration information for the at least one jukebox based on the received information, wherein the identification information comprises information selected from a group consisting of a MAC address, a hard drive identification number, a jukebox model number, a jukebox serial number, an operator user name and an operator password.

13. The system of claim 12, wherein an operator or user of the computer jukebox provides the identification information in response to a prompt on the display for identification information.

14. The system of claim 13, wherein the operator enters the identification information while the computer jukebox is operating in a service mode.

15. The system of claim 12, wherein the central server receives said identification information and updated registration information from an operator computer.

16. The system of claim 12, wherein the pre-selected event comprises changing a hardware component of the computer jukebox.

17. The system of claim 16, wherein the registration information comprises information selected from a group consisting of a MAC address, a hard drive identification number, a jukebox model number, and a jukebox serial number.

18. A system for updating registration information for a computer jukebox after the occurrence of a pre-selected event, comprising:

at least one computer jukebox; and a central server coupled to the computer jukebox operative to control the at least one computer jukebox, wherein the central server receives identification information and updated registration information after the occurrence of a pre-selected event, the central server being operative to validate the identity of the computer jukebox and to update the registration information for the at least one jukebox based on the received information, wherein the pre-selected event comprises changing a hardware component of the computer jukebox.

19. The system of claim 18, wherein the hardware component is selected from a group consisting of the Network Interface Card, the hard drive, the motherboard, the RAM, a CD drive, a DVD drive, a CPU, and a monitor.

20. A system for updating registration information for a computer jukebox after the occurrence of a pre-selected event, comprising:

at least one computer jukebox; and a central server coupled to the computer jukebox operative to control the at least one computer jukebox, wherein the central server receives identification information and updated registration information after the occurrence of a pre-selected event, the central server being operative to validate the identity of the computer jukebox and to update the registration information for the at least one jukebox based on the received information, wherein the registration information comprises information selected from a group consisting of a MAC address, a hard drive identification number, a jukebox model number, and a jukebox serial number.

21. A method for updating registration information for a computer jukebox after the occurrence of a pre-selected event, comprising:

determining whether the pre-selected event has occurred;

updating information at the jukebox based on the occurrence of the pre-selected event;

sending the updated information from the computer jukebox to the central server; and updating the registration information for the computer jukebox at the central server, wherein the registration information comprises the updated information, wherein the pre-selected event comprises changing a software component of the computer jukebox.

22. A system for updating registration information for a computer jukebox after the occurrence of a pre-selected event, comprising:

at least one computer jukebox; and a central server coupled to the computer jukebox operative to control the at least one computer jukebox, wherein the central server receives identification information and updated registration information after the occurrence of a pre-selected event, the central server being operative to validate the identity of the computer jukebox and to update the registration information for the at least one jukebox based on the received information, wherein the pre-selected event comprises changing a software component of the computer jukebox.

* * * * *